United States Patent [19]
Anderson et al.

[11] Patent Number: 6,015,016
[45] Date of Patent: Jan. 18, 2000

[54] STOWABLE DRIVELINE CONNECTION AID FOR POWER-DRIVEN FARM IMPLEMENTS

[75] Inventors: J. Dale Anderson, Canton; Don Fuqua, Hesston, both of Kans.

[73] Assignee: Hay & Forage Industries, Hesston, Kans.

[21] Appl. No.: 08/897,471

[22] Filed: Jul. 21, 1997

[51] Int. Cl.$^7$ .................................................. A01B 59/00
[52] U.S. Cl. .......................................... 172/677; 180/53.1
[58] Field of Search ............................ 172/605, 677–680;
248/601, 291.1; 180/53.1, 53.3; 280/789,
479.2, 408

[56] References Cited

U.S. PATENT DOCUMENTS

| | | | |
|---|---|---|---|
| 2,429,492 | 10/1947 | Scranton | 56/218 |
| 2,744,705 | 5/1956 | Richter | 248/50 |
| 2,869,660 | 1/1959 | Miller et al. | 180/53.1 |
| 3,908,398 | 9/1975 | Braunberger | 180/14.4 |
| 4,020,913 | 5/1977 | Yatcilla | 180/14 R |
| 4,433,767 | 2/1984 | Thor | 248/601 X |
| 5,303,789 | 4/1994 | Adamson et al. | 180/53.1 |
| 5,330,084 | 7/1994 | Peters | 248/291.1 X |

*Primary Examiner*—Victor Batson
*Attorney, Agent, or Firm*—Hovey, Williams, Timmons & Collins

[57] ABSTRACT

The connection aid takes the form of a spring-loaded stand that is attached to the tongue of an implement for cradling support of the driveline at or near the height of the power take-off shaft of the tractor when the implement is not connected to the tractor. The driveline and the power take-off shaft can be readily aligned and reconnected when the implement is to be hitched to the tractor by simply pushing down on the driveline against the spring-loading of the stand or by slightly lifting the driveline with the help of the spring-loading of the stand to the extent necessary. Once the driveline has been connected, the stand may be swung down out of the way and into a stowed position substantially recessed below the top surface of the tongue.

18 Claims, 1 Drawing Sheet

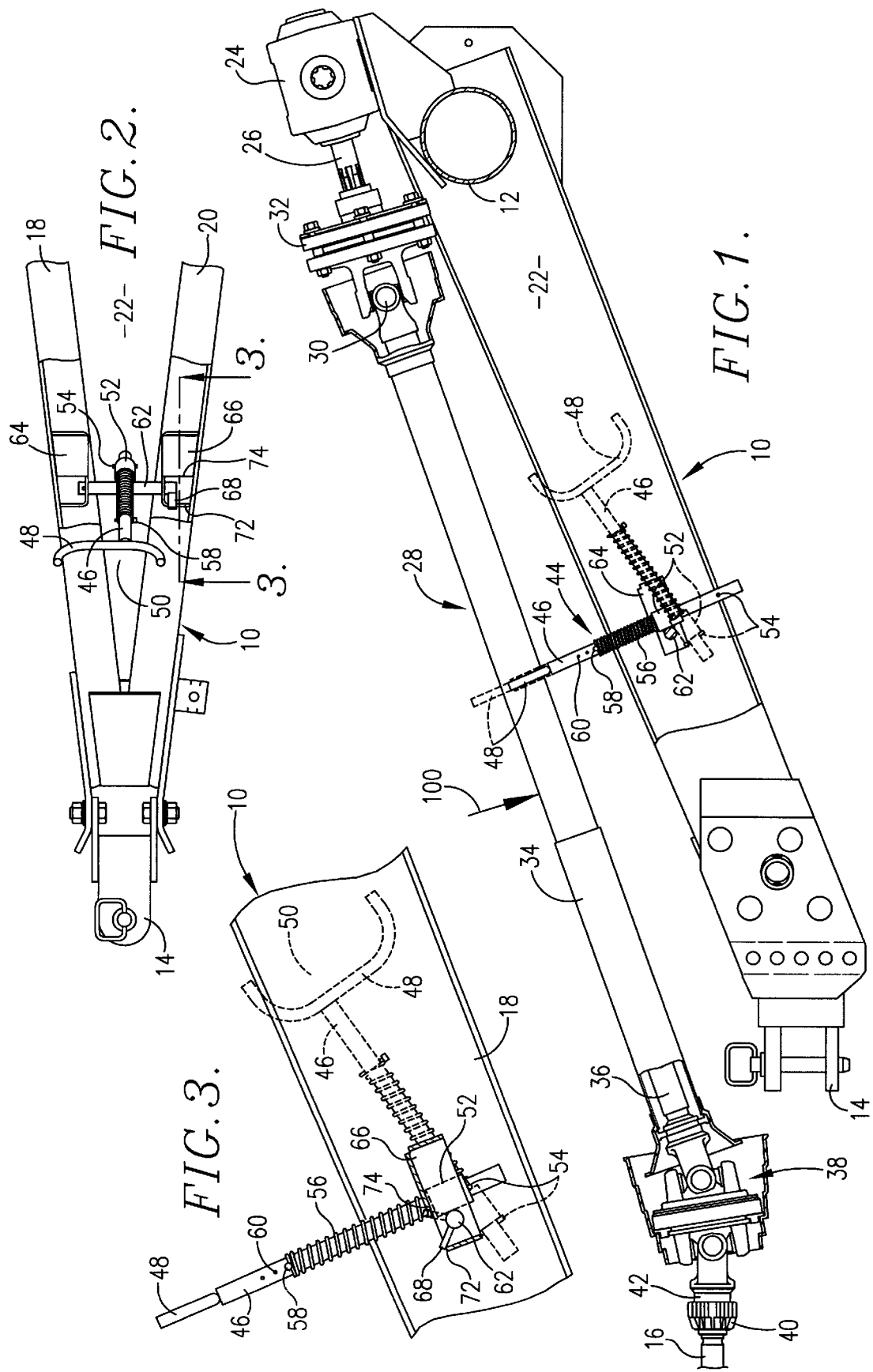

STOWABLE DRIVELINE CONNECTION AID FOR POWER-DRIVEN FARM IMPLEMENTS

TECHNICAL FIELD

This invention relates to drivelines on pull-type farm implements and, more particularly, to a device for assisting the farmer in connecting the heavy driveline of the implement to the power takeoff shaft of the tractor when it is time to prepare the implement for field operations.

BACKGROUND

As more and more drivelines on farm implements are provided with constant velocity joints at the point where they connect with the power takeoff shaft from the tractor, the drivelines become progressively heavier and more difficult for the farmer to handle on his own when he attempts to connect the driveline to the power takeoff shaft for field operations. In addition to lifting the heavy driveline to the right height, he must also properly align it with the takeoff shaft, hold it in the right position, and simultaneously manipulate the releasable coupling between the two structures in the right way to properly interengage them. This can be a tedious, physically trying and frustrating experience, particularly if the coupling becomes impacted with grease and grime and trash so that the parts are difficult to move.

SUMMARY OF THE PRESENT INVENTION

Accordingly, one important object of the present invention is to provide a driveline connection aid that supports the heavy load of the driveline for the farmer as he aligns the driveline with the power takeoff shaft and manipulates the components of the coupling in the manner necessary to establish a secure connection between the takeoff shaft and the driveline, or to disconnect the driveline from the take-off shaft.

Another important object of the invention is to provide a connection aid that is carried on the implement itself so as to be always available for use, yet which can be readily placed in a stowed condition during times of non-use.

An additional important object of the invention is to provide a driveline connection aid in which the holding height of the device can be quickly and easily adjusted.

In carrying out the foregoing and other objects, the present invention contemplates a connection aid in the nature of a support stand mounted on the tongue or other frame structure of the implement and selectively placeable in either a stowed position out of engagement with the driveline or a use position for engaging and supporting the driveline to facilitate connection and disconnection thereof from the power take-off shaft of the tractor. The stand is spring-biased upwardly to provide support that is yieldable rather than rigid, thus permitting the user to manually lift the driveline with the help of the spring if movement in that direction is required for proper alignment, or manually lower the driveline against the action of the spring if movement in the lowering direction is necessary. The stand can be adjustably extended or retracted to thus adjust the amount of spring force at a given height or to maintain the same spring force at a different height.

BRIEF DESCRIPTION OF THE DRAWINGS

FIG. 1 is a fragmentary side elevational view of an implement with its driveline connected to the power take-off shaft of a towing vehicle, parts of the tongue of the implement being broken away to reveal a driveline connection aid embodying the concepts of the present invention, the connection aid being shown in its use position in full lines and in its laid down, stowed position in phantom lines;

FIG. 2 is a fragmentary top plan view of the implement tongue and connection aid with portions of the tongue broken away to reveal details of construction; and FIG. 3 is an enlarged, fragmentary cross-sectional view of the connection aid taken substantially along line 3—3 of FIG. 2.

DETAILED DESCRIPTION

The tongue 10 in FIG. 1 may comprise part of many different types of implements without departing from the scope of the present invention. The tongue chosen for illustration is from a round baler, but the present invention can obviously be used in connection with a variety of different implements.

As illustrated, the tongue 10 projects downwardly and forwardly from a transverse frame member 12 and has a hitch 14 at its front end for connecting the implement with a towing tractor. The tractor is not shown, except for the power take-off shaft 16 which projects rearwardly from the tractor at a height slightly above the hitch 14. In the illustrated embodiment the tongue 10 is formed primarily by a pair of forwardly converging beams 18 and 20 that are joined together in the vicinity of the hitch 14 and are separated from one another rearwardly of the hitch to present a generally triangular open space 22 therebetween.

A right angle gear box 24 is mounted on the frame of the implement at the upper rear end of the tongue 10 and has a forwardly projecting input shaft 26. A driveline broadly denoted by the numeral 28 is operably coupled with the input shaft 26 through a U-joint 30 and a slip clutch 32 for supplying driving power to the gear box 24 from the power take-off shaft 16. In the illustrated embodiment, the driveline 28 includes a telescoping, tubular safety shield 34 and a long drive shaft 36 housed within the shield 34. The U-joint 30 is located at the rear end of the drive shaft 36, while a constant velocity joint (CV-joint) 38 is located at the front end of the shaft 36. The CV-joint 38, in turn, is connected to the power take-off shaft 16.

The CV-joint 38 includes a locking collar 40 that must be manually retracted from its locked position illustrated in the figures in order to connect and disconnect the driveline 28 to and from the power take-off shaft 16. Before the locking collar 40 can be slipped into its locking position when the driveline 28 is being connected to the power take-off shaft 16, however, a splined tubular member 42 associated with one of the yokes of the CV-joint 38 must be axially aligned with the power take-off shaft 16 and maintained in such alignment during manipulation of the collar 40.

The connection aid 44 of the present invention takes the form of a spring-loaded stand mounted on the tongue 10 and selectively placeable in either use or stowed positions. The stand 44 has a long, circular in cross-section support or shank 46 having a generally C-shaped yoke or cradle 48 fixed to its upper end. The cradle 48 is provided with a mouth 50 that is sufficiently wide as to readily accept the outer diameter of the driveline 28 when the stand 44 is in its use position. In the preferred embodiment, the mouth of the cradle 48 is a few inches wider than the outer diameter of the driveline 28 and the cradle 48 is slightly asymmetrically attached to the upper end of the shank 46. This allows the driveline 28 to be pushed to one side of the cradle to make it easier for the farmer to see the hitch 14 when he is attaching the implement to the tractor. After the implement is hitched to the tractor, the driveline 28 can be recentered for connecting the driveline to the power take-off shaft.

The shank 46 is telescopically received within a sleeve 52 located on the center line of the tongue 10 in fore-and-aft alignment with the hitch 14. A cross pin 54 passing through the lower end of the shank 46 below the sleeve 52 can engage the sleeve 52 to preclude withdrawal of the shank 46 completely from the sleeve 52. A helical compression spring 56 encircles the shank 46 on the opposite side of the sleeve 52 and has its lower end resting upon the sleeve 52. A projection in the form of a retaining pin 58 is selectively insertable into any one of a number of holes 60 along the shank 46 and is long enough to span the upper end of the spring 56. Consequently, the spring 56 is trapped between the pin 58 on the one hand and the sleeve 52 on the other hand so as to exert an upward biasing force on the shank 46 tending to extend shank 46 from the sleeve 52. The particular hole 60 selected to receive the retaining pin 58 determines the degree to which the shank 46 is extended from the sleeve 52 and the coil spring 56. The shank 46 is free to rotate within the sleeve 52 so that the stand 44 may be manually turned 90° degrees about the longitudinal axis of the shank 46 when the stand 44 is moved from its use position to its stowed position, and vice versa.

The sleeve 52 is centrally fixed to a transverse pivot shaft 62 that spans the two beams 18 and 20 of the tongue 10 below the top surface of the beams. The pivot shaft 62 is journaled at its opposite ends by respective mounting brackets 64 and 66 welded to the inner surfaces of the beams 18 and 20. The bracketry 64 and 66, pivot shaft 62, and sleeve 52 collectively comprise mounting structure that couples the shank 46 with the tongue 10.

An upwardly projecting stop 68 is fixed to the pivot shaft 62 for the purpose of limiting the extent of pivoting movement of the stand 44, i.e., preventing movement of the stand 44 upwardly past its use position shown in full lines in FIG. 1 and downwardly past its stowed position shown in phantom lines in FIG. 1. The stop 68 is disposed to abuttingly engage an edge 72 of the bracket 66 when the stand is in the use position, hence precluding movement past such position, and is disposed to abuttingly engage a second edge 74 of the bracket 66 when the stand 44 is in its stowed position, hence precluding movement past the stowed position. The stop 68 is so positioned that the center of gravity of the shank 46 has moved slightly past vertical when the stand 44 is in its use position. Thus, the stand 44 tends to remain in its use position by gravity. Furthermore, the stop 68 is so positioned that when the stand 44 supports the driveline 28, the angle between the driveline 28 and the shank 46 on the front side of the shank 46 is an obtuse angle, i.e., greater than 90° degrees. The weight of the driveline 28 bearing down against the stand 44 thus tends to keep the stand in its use position. The position of the stop 68 is also such that the center of gravity of the shank 46 is on the opposite side of vertical when the stand 44 is in its stowed position. Thus, the stand 44 also tends to remain in its stowed position by gravity.

In the past drivelines such as the driveline 28 have been allowed to simply swing down about the U-joint 30 and rest on top of the tongue 10 when the implement was not being used. Thus, in order to connect the driveline with the power take-off shaft 16 of the tractor, the farmer had to lift up the driveline 28 with its heavy, wobbly CV-joint 38, align the splined member 42 of the CV-joint with the power takeoff shaft 16, and appropriately manipulate the locking collar 40 while still bearing the load of the driveline. Often times, this would turn into a trying experience as the farmer attempted to balance the heavy load of the driveline and maintain perfect alignment of the inner connecting parts all the while manipulating components of the wobbly coupling that were fouled with grit and grime and were reluctant to cooperate.

With the present invention, it is contemplated that the stand 44 will be up in its use position cradling and supporting the driveline 28 when the implement is idle and disconnected from the tractor. Thus, instead of lifting the entire weight of the heavy driveline 28 before connecting its front end to the power take-off shaft 16, the farmer may need to do nothing more than simply align the splined member 42 with the power take-off shaft 16 and appropriately manipulate the collar 40. If the driveline 28 needs to be raised slightly, the farmer can readily lift the driveline with little effort to the extent necessary because of the assistance of the coil spring 56. On the other hand, if he needs to lower the driveline somewhat, he can readily push down on the driveline to compress the spring 56 until the desired alignment is achieved. The phantom line position of the cradle 48 in FIG. 1 with the stand 44 in its use position illustrates the position of the cradle 48 when the shank 46 is fully extended by the spring 56. In its solid line position in FIG. 1, the stand 44 is slightly retracted under the weight of the driveline 28 or depression by the operator as indicated by the arrow 100.

Once the driveline has been connected to the power take-off shaft 16, the stand 44 may be swung down to its stowed position. The spring 56 can be further depressed by the operator during such movement of the stand 44 to facilitate disengagement of the stand from the driveline. Once the cradle 48 has been swung down below the driveline 28, the shank 46 may be rotated 90° degrees to align the cradle 48 for passing between the beams 18,20 of the tongue 10. This allows the stand 44 to be placed in its fully stowed position almost entirely below the upper surface of the tongue 10. There the stand 44 may remain until it is needed to assist in disconnecting the driveline 28 from the power take-off shaft 16. At that time, the stand 44 is swung up to its use position and rotated 90° degrees to properly turn the cradle 48 for receiving the driveline 28 as the stand 44 is raised into position. Desirably, the shank 46 is extended to such a degree that as the cradle 48 comes up into engagement with the bottom of the driveline 28, continued raising of the stand 44 causes the shank 46 to compress the spring 56, thus providing a spring-biased uplifting force to the driveline 28 when the stand 44 is in its use position. The farmer then merely manipulates the locking collar 40 and allows the wobbly CV-joint 38 to hinge down about one of its joints, while the rest of the driveline 28 remains fully supported by the stand 44.

It is to be noted that the stand 44 is positioned so as to engage and support the stationary or non-telescoping part of the driveline 28. Thus, the front telescoping part of the driveline 28 can be shifted fore-and-aft during connection and disconnection without causing the stand 44 to be shifted.

Although preferred forms of the invention have been described above, it is to be recognized that such disclosure is by way of illustration only, and should not be utilized in a limintling sense in interpreting the scope of the present invention. Obvious modifications to the exemplary embodiments, as hereinabove set forth, could be readily made by those skilled in the art without departing from the spirit of the present invention.

The inventor(s) hereby state their intent to rely on the Doctrine of Equivalents to determine and assess the reasonably fair scope of their invention as pertains to any apparatus not materially departing from but outside the literal scope of the invention as set out in the following claims.

We claim:

1. In combination with a farm implement having a mobile frame including a fore-and-aft tongue for hitching the implement to a towing tractor having a power takeoff shaft, the implement further having a driveline extending along and above the tongue for transferring driving power from the power takeoff shaft to operating components on the frame when the driveline is connected with the power takeoff shaft, a combination support stand and manual connection aid for the driveline comprising:

a support for the driveline;

mounting structure coupling said support with the tongue for selective manual positioning of the support in either a stowed position down out of engagement with the driveline when the driveline is connected to and supported by the power takeoff shaft or a use position up in engagement with the driveline when the driveline is disconnected from and unsupported by the power takeoff shaft, said support being disposed to be aligned laterally with the power takeoff shaft when the support is in its use position for supporting the driveline in lateral alignment with the power takeoff shaft during manual re-connection of the driveline to the power takeoff shaft, said support being extendible relative to said mounting structure; and a spring operably associated with said support for yieldably extending the support relative to the mounting structure such that the support carries the driveline in lateral alignment with the power takeoff shaft during re-connection of the driveline to the power takeoff shaft and yieldably supports the load of the driveline.

2. In the combination as claimed in claim 1, said support including an upper, driveline-engaging end, said spring and said support being adjustable interconnected to permit adjustment of the height of said upper end above the tongue.

3. In the combination as claimed in claim 2, said support being mounted for pivoting movement between said stowed and use positions.

4. In the combination as claimed in claim 3, said mounting structure including stop structure for preventing movement of the support past said use position when the support is raised from the stowed position.

5. In the combination as claimed in claim 1, said support being mounted for pivoting movement between said stowed and use positions.

6. In the combination as claimed in claim 5, said combination support stand and driveline connection aid further including stop structure for preventing movement of the support past said use position when the support is raised from the stowed position.

7. In the combination as claimed in claim 1, said mounting structure including bracketry fixed to the tongue, a transverse shaft journaled by said bracketry, and a sleeve fixed to said shaft, said sleeve telescopically recieving said support, said support having a projection, said spring being trapped between the projection and the sleeve.

8. In the combination as claimed in claim 1, said driveline being telescopic with a non-extendable part and an extentable part, said support being disposed to engage and support said non-extendable part of the driveline when the support is in its use position.

9. In the combination as claimed in claim 1, said support having a cradle for receiving the driveline, said cradle being wider than the driveline to permit a limited amount of lateral adjusting movement of the driveline within the cradle.

10. In a farm implement, the improvement comprising:

a mobile frame including a fore-and-aft tongue for hitching the implement to a towing tractor having a power takeoff shaft;

a driveline extending along and above the tongue for transferring driving power from the power takeoff shaft to operating components on the frame when the driveline is connected with the power takeoff shaft; and a support stand mounted on the tongue in such a manner that the stand can be selectively disposed in either a stowed positin out of engagement with the driveline when the driveline is connected to and supported by the power takeoff shaft or a use position for supporting the driveline when the driveline is disconnected from and unsupported by the power takeoff shaft, said stand including a portion that is biased upwardly in the direction of the driveline when the stand is in its use position, said stand including a spring for effecting said upward bias on said portion of the stand, said spring and said portion being adjustably interconnected to permit adjustment of an amount of lift provided by the stand on the driveline at a given height above the tongue, said stand being mounted for pivoting movement between said stowed and use positions, said stand and said tongue having interengageale stop structure for preventing movement of the stand past said use position when the stand is raised from the stowed position, said stand having a center of gravity that is disposed on one side of vertical when the stand is in its stowed position and on the opposite side of vertical when the stand is in its use position, said stand being gravitationally biased toward one or the other of said positions depending upon the side of vertical on which the stand is disposed.

11. In a farm implement as claimed in claim 10, said stand and said tongue having second interengageable stop structure for preventing movement of the stand past said stowed position as the stand is lowered from the use position.

12. In a farm implement as claimed in claim 11, said tongue including a pair of laterally spaced apart members, said portion of the stand having a receiving yoke at an upper end thereof that is wider than the space between the pair of members, said portion being rotatable into a position disposing the yoke for edge-wise passage between the members as the stand is moved between its stowed and use positions.

13. In a farm implement as claimed in claim 10, said stand being disposed when in its use position to engage the driveline at an obtuse angle such that the weight of the driveline is directed downwardly in front of the stand for retaining the stand in the use position.

14. In a farm implement, the improvement comprising:

a mobile frame including a fore-and-aft tongue for hitching the implement to a towing tractor having a power takeoff shaft;

a driveline extending along and above the tongue for transferring driving power from the power takeoff shaft to operating components on the frame when the driveline is connected with the power takeoff shaft; and a support stand mounted on the tongue in such a manner that the stand can be selectively disposed in either a stowed position out of engagement with the driveline when the driveline is connected to and supported by the power takeoff shaft or a use position for supporting the driveline when the driveline is disconnected from and unsupported by the power takeoff shaft, said stand being mounted for pivoting movement between said stowed and use positions, said stand and said tongue having interengageable stop structure for preventing movement of the stand past said use position when the stand is raised from the stowed position, said stand having a center of gravity that is disposed on one side of vertical when the stand is in its stowed position and on the opposite side of vertical when the stand is in its use position, said stand being gravitationally biased toward one or the other of said positions depending upon the side of vertical on which the stand is disposed.

15. In a farm implement as claimed in claim 14, said stand and said tongue having second interengageable stop structure for preventing movement of the stand past said stowed position as the stand is lowered from the use position.

16. In a farm implement as claimed in claim 15, said tongue including a pair of laterally spaced apart members, said portion of the stand having a receiving yoke at an upper end thereof that is wider than the space between the pair of members, said portion being rotatable into a position disposing the yoke for edge-wise passage between the members as the stand is moved between its stowed and use positions.

17. In a farm implement as claimed in claim 14, said stand being disposed when in its use position to engage the driveline at an obtuse angle such that the weight of the driveline is directed downwardly in front of the stand for retaining the stand in the use position.

18. In a farm implement, the improvement comprising:

a mobile frame including a fore-and-aft tongue for hitching the implement to a towing tractor having a power takeoff shaft;

a driveline extending along and above the tongue for transferring driving power from the power takeoff shaft to operating components on the frame when the driveline is connected with the power takeoff shaft; and a support stand mounted on the tongue in such a manner that the stand can be selectively disposed in either a stowed position out of engagement with the driveline when the driveline is connected to and supported by the power takeoff shaft or a use position for supporting the driveline when the driveline is disconnected from and unsupported by the power takeoff shaft, said stand including a pair of relatively telescoping, upper and lower portions, said lower portion being pivotally mounted on the tongue to provide for swinging movement of the stand between said stowed and use positions, said upper portion having a spring yieldably extending the upper portion relative to the lower portion, said spring comprising a coil spring encircling the stand and operably interposed between the upper and lower portions thereof, said spring having structure for permitting the spring to be connected to the upper portion at any selected one of a number of locations along the upper portion for adjusting the lift provided by the stand on the driveline at a given height above the tongue.

* * * * *